United States Patent
Guditz et al.

(10) Patent No.: US 10,193,694 B1
(45) Date of Patent: Jan. 29, 2019

(54) METHOD AND APPARATUS FOR SECURELY CONFIGURING PARAMETERS OF A SYSTEM-ON-A-CHIP (SOC)

(71) Applicant: Marvell International Ltd., Hamilton (BM)

(72) Inventors: Paul Guditz, Acton, MA (US); Tolga Nihat Aytek, Framingham, MA (US); Deniz Karakoyunlu, Cambridge, MA (US); Minda Zhang, Westford, MA (US)

(73) Assignee: Marvell International Ltd., Hamilton (BM)

( * ) Notice: Subject to any disclaimer, the term of this patent is extended or adjusted under 35 U.S.C. 154(b) by 296 days.

(21) Appl. No.: 15/297,989

(22) Filed: Oct. 19, 2016

Related U.S. Application Data

(60) Provisional application No. 62/246,204, filed on Oct. 26, 2015.

(51) Int. Cl.
| | |
|---|---|
| *H04L 9/14* | (2006.01) |
| *H04L 9/30* | (2006.01) |
| *H04L 9/32* | (2006.01) |
| *G06F 21/44* | (2013.01) |
| *G01R 31/317* | (2006.01) |
| *G06F 9/4401* | (2018.01) |
| *G01R 31/3185* | (2006.01) |

(52) U.S. Cl.
CPC .......... *H04L 9/3236* (2013.01); *G06F 9/4406* (2013.01); *G06F 21/44* (2013.01); *H04L 9/14* (2013.01); *H04L 9/30* (2013.01); *G01R 31/31719* (2013.01); *G01R 31/318597* (2013.01)

(58) Field of Classification Search
CPC ... H04L 63/061; H04L 9/0838; H04L 9/0841; H04L 9/0861
See application file for complete search history.

(56) References Cited

U.S. PATENT DOCUMENTS

| | | | |
|---|---|---|---|
| 2015/0039890 A1* | 2/2015 | Khosravi | H04L 9/0841 713/171 |
| 2015/0048684 A1* | 2/2015 | Rooyakkers | H04L 9/3263 307/65 |
| 2017/0163616 A1* | 6/2017 | Smith | H04L 63/061 |
| 2017/0201380 A1* | 7/2017 | Schaap | G06F 8/654 |

\* cited by examiner

*Primary Examiner* — Terrell S Johnson

(57) ABSTRACT

Embodiments include a method comprising: receiving, by a system-on-a-chip (SOC) from a host, a public key of a public/private key pair; generating a first hash value of the public key; authenticating the first hash value; in response to authenticating the first hash value, transmitting, by the SOC, a first nonce to the host; receiving a signed nonce from the host, the signed nonce being signed using a private key of the public/private key pair; decrypting, using the received public key, the signed nonce to generate a second nonce; based on the first nonce and the second nonce, authenticating the host; in response to authenticating the host, receiving, from the host, a command to configure one or more parameters of the SOC; and configuring the one or more parameters of the SOC.

20 Claims, 3 Drawing Sheets

METHOD AND APPARATUS FOR SECURELY CONFIGURING PARAMETERS OF A SYSTEM-ON-A-CHIP (SOC)

CROSS REFERENCE TO RELATED APPLICATIONS

This disclosure claims priority to U.S. Provisional Patent Application No. 62/246,204, filed on Oct. 26, 2015, which is incorporated herein by reference in its entirety.

TECHNICAL FIELD

Embodiments of the present disclosure relate to computer architecture, and in particular to securely configuring one or more parameters of a system-on-a-chip (SOC).

BACKGROUND

The Joint Test Action Group (JTAG) is an electronics industry association formed for developing a method of verifying designs and testing printed circuit boards after manufacture. The Institute of Electrical and Electronics Engineers (IEEE) codified the results of the effort in IEEE Standard 1149.1-1990, entitled Standard Test Access Port and Boundary-Scan Architecture.

JTAG functionalities in a system-on-a-chip (SOC) is used extensively for testing and debugging the SOC. A testing arrangement external to the SOC can gain critical information about the SOC (e.g., information about how the SOC runs, internal structure of the SOC, internal codes programmed within the SOC, etc.) by testing the SOC using the JTAG functionalities of the SOC. However, a manufacturer of a SOC may not intend that an unauthorized third party access such critical information about the SOC. Similarly, a manufacturer of a SOC may not intend that an unauthorized third party configure various critical parameters of the SOC.

SUMMARY

In various embodiments, the present disclosure provides a method comprising: receiving, by a system-on-a-chip (SOC) from a host, a public key of a public/private key pair; generating a first hash value of the public key; authenticating the first hash value; in response to authenticating the first hash value, transmitting, by the SOC, a first nonce to the host; receiving a signed nonce from the host, the signed nonce being signed using a private key of the public/private key pair; decrypting, using the received public key, the signed nonce to generate a second nonce; based on the first nonce and the second nonce, authenticating the host; in response to authenticating the host, receiving, from the host, a command to configure one or more parameters of the SOC; and configuring the one or more parameters of the SOC.

In various embodiments, the present disclosure also provides a method comprising: transmitting, by a host to a system-on-a-chip (SOC), a public key of a public/private key pair, wherein the SOC generates a first hash value of the public key, authenticates the first hash value, and transmits a first nonce to the host; signing, by the host, the first nonce using a private key of the public/private key pair to generate a signed nonce; transmitting the signed nonce to the SOC, wherein the SOC decrypts the signed nonce, using the received public key, to generate a second nonce, and wherein the SOC authenticates the host based on the first nonce and the second nonce; in response to the SOC authenticating the host, transmitting, to the SOC, a command to configure one or more parameters of the SOC.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

FIG. 1 illustrates an example system for securely enabling or setting one or more features of a system-on-a-chip (SOC), e.g., enabling JTAG functionalities of the SOC, setting one or more parameters of the SOC, and/or the like.

DETAILED DESCRIPTION

Figure 1:
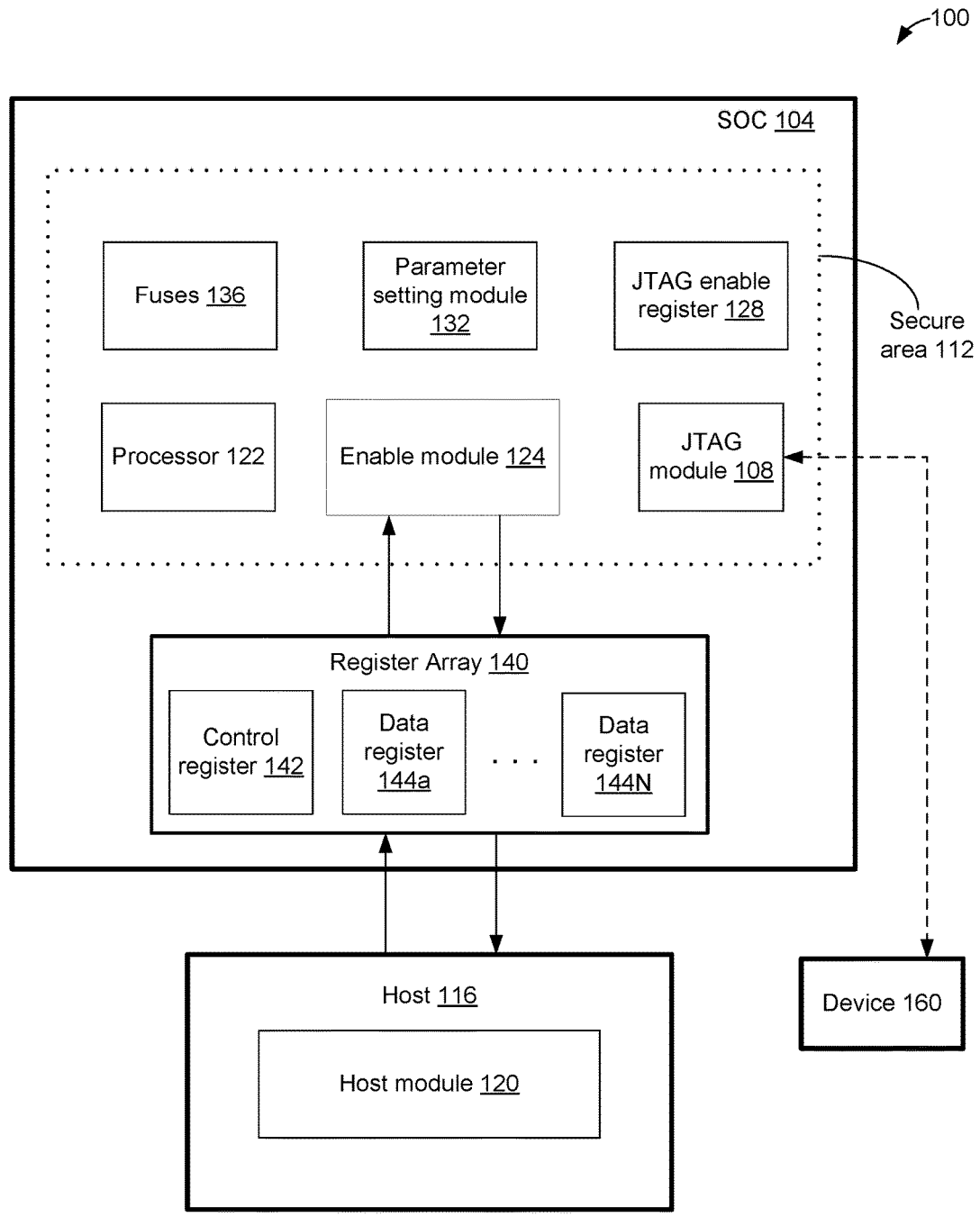

FIG. 1 illustrates an example system 100 for securely enabling or setting one or more features of a system-on-a-chip (SOC) 104, e.g., enabling JTAG functionalities of the SOC 104, setting one or more parameters of the SOC 104, and/or the like. The system 100 comprises the SOC 104 and a host 116. In an example, the host 116 facilitates securely enabling or setting the features of the SOC 104.

In an embodiment, the SOC 104 comprises a JTAG module 108 that provides various JTAG functionalities to the SOC 104. JTAG functionalities, unless mentioned otherwise, refer herein to one or more functionalities that are in accordance with the JTAG protocol. For example, the JTAG functionalities of the SOC 104 refer to testing of the SOC 104 in accordance with the JTAG protocol, debugging of the SOC 104 in accordance with the JTAG protocol, and/or various other functionalities associated with the JTAG protocol. The JTAG module 108 comprises appropriate software, hardware and/or firmware, or a combination thereof, that provides various JTAG functionalities to the SOC 104. As an example, the JTAG module 108 enables testing of the SOC 104, debugging of the SOC 104, and/or various other functionalities associated with the JTAG protocol. For example, the JTAG module 108 comprises testing arrangement to test the SOC 104, a communication interface to transmit the test results to an external device, and/or the like.

In an embodiment, the JTAG module 108 can be either enabled or disabled. When the JTAG module 108 is enabled, the JTAG module 108 provides the JTAG functionalities. As an example, when the JTAG module 108 is enabled, the JTAG module 108 communicates with a device 160 to enable testing and/or debugging of the SOC 104 in accordance with the JTAG protocol. For example, when enabled, the JTAG module 108 receives testing instruction from the device 160, tests the SOC 104, and/or transmits the test results to the device 160. The device 160, for example, is an external testing and/or debugging arrangement to test and/or debug the SOC 104 in accordance with the JTAG protocol. In an example, the device 160 and the host 116 are the same device, e.g., the device 160 is included within the host 116, and the host 116 tests the SOC 104 and receives test results from the SOC 104.

When the JTAG module 108 is disabled, the JTAG module 108 does not, at least in part, provide the JTAG functionalities. As an example, when the JTAG module 108 is disabled, the JTAG module 108 tests the SOC 104, but does not communicate the test results to the device 160. In another example, when the JTAG module 108 is disabled, the JTAG module 108 does not perform any testing of the SOC 104. Thus, when disabled, the JTAG module 108 does not fully provide the JTAG functionalities.

The communication connection between the JTAG module 108 and the device 160 is illustrated using dashed lines, for example, to emphasize that the device 160 may not be communicatively coupled to the JTAG module 108 when the host 116 securely enables or sets one or more features of the SOC 104, e.g., enables the JTAG functionalities of the SOC 104. In an example, subsequent to the host 116 securely enabling the one or more features of the SOC 104 (e.g., enabling the JTAG module 108 of the SOC 104), the device 160 communicates with the JTAG module 108 to execute the JTAG functionalities of the SOC 104.

In FIG. 1, an area within the SOC 104 is labeled as a secure area 112 (illustrated using dotted lines). Various components of the SOC 104, which are within the secure area 112, can generally be accessed only by an authorized user, and cannot generally be accessed by an unauthorized user. For example, a manufacturer (e.g., an Original Equipment Manufacturer (OEM)) of the SOC 104 and/or an authorized user of the SOC 104 can access the secured area 112 of the SOC 104. As an example, an access to the secured area 112 is performed via the JTAG module 108. For example, using the JTAG functionalities (e.g., while the JTAG module 108 is enabled), the OEM or an authorized user of the SOC 104 can access the secured area of the SOC 112 and gain useful information about the SOC 104 by testing and/or debugging the SOC 104 using the JTAG module 108. In an embodiment, an unauthorized user is prevented from accessing such useful information about the SOC 104 by disabling the JTAG module 108 while the SOC 104 is manufactured. If the OEM or an authorized user of the SOC 104 wants to access the secured area of the SOC 104, test the SOC 104, debug the SOC 104, and/or gain useful information about the SOC 104, the OEM or an authorized user of the SOC 104 enables the JTAG module 108, as discussed in more detail herein later. However, as also discussed in more detail herein later, an unauthorized user cannot enable the JTAG module 108 within the SOC 104. Thus, an unauthorized user of the SOC 108 cannot access the secured area 112 of the SOC 104, and cannot gain access to useful information about the SOC 104 via the JTAG module 108.

In an embodiment, the SOC 104 comprises an enable module 124 configured to communicate with the host 116, and securely enable the JTAG module 108 and/or securely set various parameter of the SOC 104. In an example, the enable module 124 is within the secure area 112 of the SOC 104, and cannot be readily accessed or configured by an unauthorized user of the SOC 104.

In an example, the enable module 124 comprises appropriate hardware, software and/or firmware, or a combination thereof, for communicating with the host 116, securely enabling the JTAG module 108, and/or securely setting various parameter of the SOC 104. Merely as an example, the enable module 124 comprises a BootROM of the SOC 104. BootROM (or Boot ROM), for example, comprises boot code written in a ROM (read only memory) or a write-protected flash memory embedded inside the SOC 104. In an example, the BootROM contains code which are executed by the SOC 104 on power-on or reset. In another example, the enable module 124 comprises a wireless trusted module (WTM).

In an embodiment, the SOC 104 further comprises a JTAG enable register 128 (henceforth referred to as "register 128"). In an example, the register 128 is within the secure area 112 of the SOC 104, and cannot be readily accessed or configured by an unauthorized user of the SOC 104. The content written in the register 128, for example, controls whether the JTAG module 108 is enabled or disabled. Merely as an example, the register 128 is a one bit register—the JTAG module 108 is enabled if a value of "1" is written in the register 128, and the JTAG module 108 is disabled if a value of "0" is written in the register 128. The enable module 124 selectively writes in the register 128, thereby controlling the enablement of the JTAG module 108.

In an embodiment, the SOC 104 further comprises a parameter setting module 132. The parameter setting module 132 stores one or more configuration parameters associated with the SOC 104. In an example, the parameter setting module 132 is within the secure area 112 of the SOC 104, and cannot be readily accessed or configured by an unauthorized user of the SOC 104. In an example, the enable module 124 can write to the parameter setting module 132, thereby setting one or more parameters of the SOC 104, as will be discussed in more detail herein later.

In an embodiment, the SOC 104 further comprises one or more fuses 136. The fuses 136 can be programmed (e.g., selectively burnt) to store various parameters or values within the SOC 104. The fuses 136, once programmed, cannot be rewritten or changed. In another embodiment, the fuses 136 can be replaced by any other appropriate secured memory component, e.g., a read only memory, a secure memory, or the like. In an example, the fuses 136 are within the secure area 112 of the SOC 104, and cannot be readily accessed or configured by an unauthorized user of the SOC 104.

In an embodiment, the enable module 124 communicates with the host 116 via a plurality of registers included in a register array 140. In an example, the register array 140 is included within an unsecured area of the SOC 104. For example, an OEM or an authorized user, as well as any third party unauthorized user, can access the register array 140.

The register array 140 includes, for example, a control register 142 and one or more data registers 144a, ..., 144N. That is, there are N number of data registers 144, where N is an integer that is equal to, or greater than one. In an embodiment, the register array 140 can be accessed by the enable module 124 and the host 116.

When the host 116 wants to transmit data to the enable module 124, the host 116 writes the data to the register array 140. The enable module 124 then reads the data from the register array 140. Similarly, when the enable module 124 wants to transmit data to the host 116, the enable module 124 writes the data to the register array 140. The host 116 then reads the data from the register array 140. Thus, the register array 140 comprises bi-directional registers to communicating data between the host 116 and the enable module 124.

In an embodiment, the control register 142 is a 32 bit register. When a command is to be communicated via the register array 140 (e.g., from the host 116 to the enable module 124, or from the enable module 124 to the host 116), the control register 142 includes a field that stores the type of the command (e.g., the control register 142 stores a first value is a first type of command is to be transmitted, stores a second value is a second type of command is to be transmitted, and so on). In an example, the control register 142 also includes a single bit field that indicates if a sequence of commands is completed. In an example, the control register 142 also includes a field that stores a length of data associated with the command being transmitted—if this filed is set to zero, the command is to be ignored.

In an embodiment, the control register 142 further includes a control field. The control field is used to pass command specific parameters (e.g., parameters associated with the command being transmitted via the register array 140). For example, some bits of the control field indicate the component from which the command originates and/or a destination of the command. Also, a single command transmitted via the register array 140 can result in multiple transactions to complete the transfer of data associated with the command. One or more bits of the control field, for example, indicates which transaction of such multiple transactions is currently being processed—these bits permit the host 116 and the enable module 124 to ensure synchronization and to ensure that every command has a unique transaction number.

The data registers 144 store the actual data of the command. For example, if a command is associated with transmitting a nonce from the enable module 124, the data registers 144 stores the nonce, and the control register 142 comprises various fields for storing parameters associated with the command being transmitted via the register array 140.

In an embodiment, the host 116 comprises a host module 120. The host module 120 communicates with the enable module 124 to securely enable the JTAG module 108 and/or securely set one or more parameters of the SOC 104. The host module 120 comprises, for example, appropriate hardware, software and/or firmware, or a combination thereof, for communicating with the enable module 124, to facilitate securely enabling the JTAG module 108 and/or securely setting one or more parameters of the SOC 104. The SOC 104 further comprises a processor 122. Among other capabilities, the processor 122 can be configured to fetch and execute computer-readable instructions stored in a memory or other computer-readable media, e.g., to facilitate various operations described herein.

Figure 2:
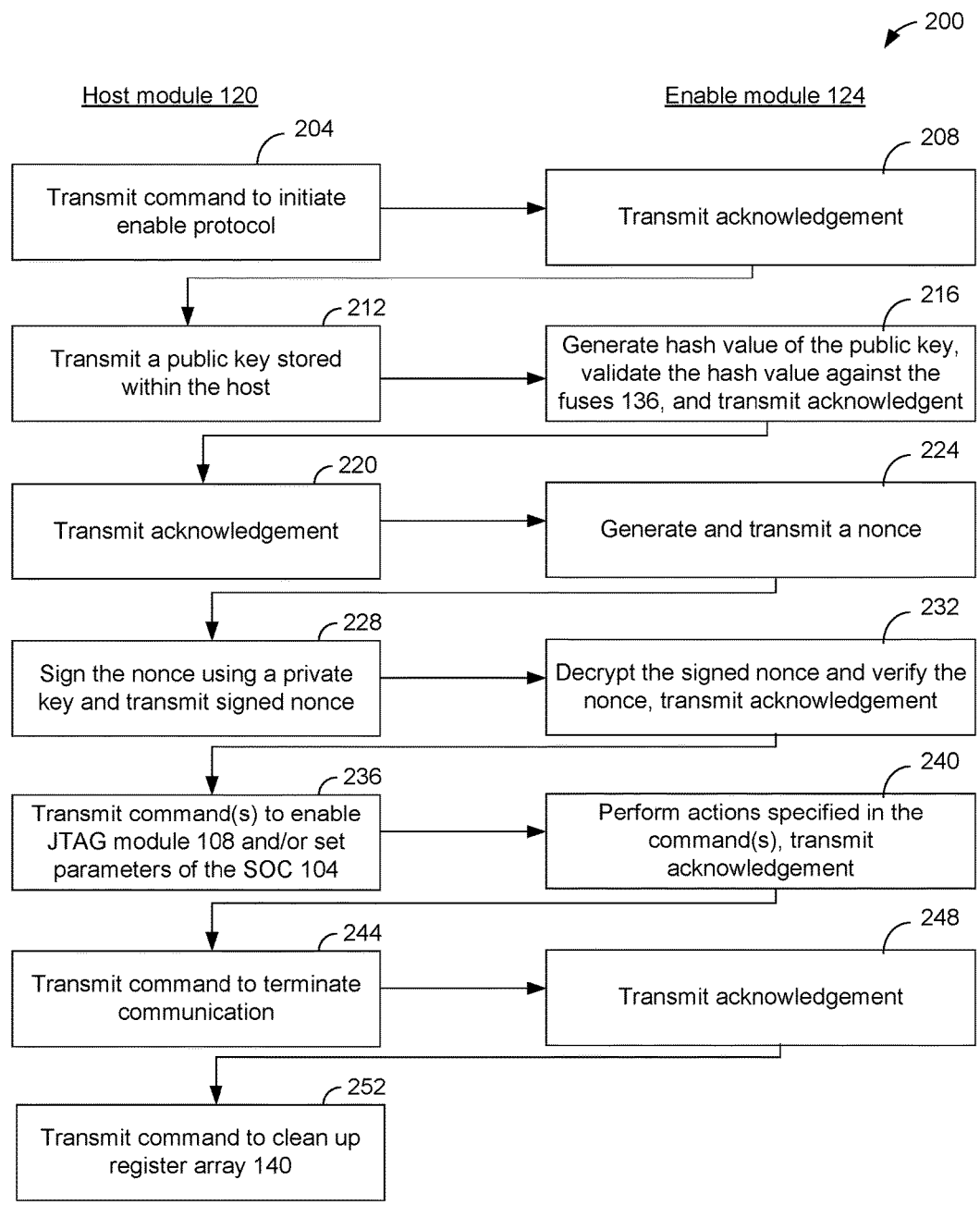
FIG. 2 illustrates an example data flow between a host and an enable module of a SOC to securely enable or set one or more features of the SOC.

FIG. 2 illustrates an example data flow 200 between the host 120 and the enable module 124 to securely enable or set one or more features of the SOC 104, e.g., enabling the JTAG module 108 of the SOC 104, setting one or more parameters of the SOC 104, and/or the like. The left side of FIG. 2 illustrates various operations performed by the host module 120 of the host 116, and the right side of FIG. 2 illustrates various operations performed by the enable module 124 of the SOC 104. The communication between the host module 120 and the enable module 124 is, for example, via the register array 140.

At the initiation of the data flow of FIG. 2, the host 116 desires to securely enable the JTAG module 108 and/or set one or more parameters to the SOC 104. At 204, the host module 120 transmits a command to initiate an enable protocol to the enable module 124, e.g., via the register array 140. The enable module 124, in response, transmits an acknowledgement at 208. In an embodiment, the acknowledgement at 208 includes capabilities of the JTAG module 108, a universal unique identification (UUID) of the SOC 104, identification of one or more parameters of the SOC 104 that can be set by the host 116, and/or the like.

At 212, the host module 120 transmits a public key of a public key/private key. In an example, the host 120 securely stores the public key and a private key of the public key/private key pair. In an example, the public key and a private key are stored in a secure area within the host 120.

At 216, the enable module 124 generates a hash value of the public key received from the host module 120. The hash value of the public key is generated using an appropriate technique to generate hash values.

In an embodiment, a hash value of a genuine public key from an OEM (or an authorized user) of the SOC 104 is securely stored in the SOC 104, e.g., programmed in the fuses 136. For example, the OEM, while manufacturing or configuring the SOC 104, programs the hash value of the genuine public key in the SOC 104. Also at 216, the enable module 124 compares the hash value generated from the public key received from the host module 120 with the hash value programmed or written in the fuses 136. If the hash values match (i.e., if the host module 120 transmits the correct public key), the enable module 124 validates the hash value generated from the public key received from the host module 120. Also at 216, upon validating the hash value, the enable module 124 transmits an acknowledgement to the host module 120.

At 220, the host module 120 receives the acknowledgement from the enable module 124, and transmits an acknowledgment in response. At 224, the enable module 124 generates a nonce, and transmits the nonce to the host module 120. The nonce, for example, is an arbitrary number that may only be used once. In an example, the nonce is a random or a pseudo-random number. In an example, the nonce is 128 bits, 256 bits, or the like.

At 228, the host module 120 signs the nonce using the private key of the public/private key pair. Thus, the private key of 228 and the public key of 212 forms the public/private key pair that is securely stored in the host 116. The host module 120 transmits the signed nonce to the enable module 124 at 228.

At 232, the enable module 124 decrypts the signed nonce using the public key received at 212. The enable module 124 compares the nonce generated from decrypting the signed nonce with the nonce generated at 224. If the two nonce match, this indicates that the host 116 has in possession the public/private key pair, where a hash value of the public key of the key pair is programmed in the fuses 136. This is an indication that the host 116 received the public/private key pair from the OEM or an authorized user of the SOC 104, thereby further indicating that the host 120 is authentic (e.g., associated with the OEM). Thus, based on the two nonce matching, the enable module 124 authenticates the host 116. Based on the enable module 124 authenticating the host 116, the enable module 124 transmits an acknowledgement at 232.

Thus, operations 204-232 are directed towards the enable module 124 authenticating the host module 120. Once the host module 120 is authenticated, the host module 120 can access the SOC 104, enable the JTAG module 108, set various parameters of the SOC 104, etc. For example, at 236, the host module 120 transmits to the enable module 124 one or more commands to enable the JTAG module 108, to set one or more parameters of the SOC 104, and/or the like.

At 240, the enable module 124 performs the actions specified in the commands, and transmit an acknowledgement to the host module 120. In an example, a command at 236 is to enable the JTAG module 108. In response to receiving the command, the enable module 124 writes in the register 128 data to enable the JTGA module 108. Merely as an example, the register 128 is a one bit register—the JTAG module 108 is enabled if a value of "1" is written in the register 128, and the JTAG module 108 is disabled if a value of "0" is written in the register 128. The enable module 124 writes the value of "1" in the register 128, thereby enabling the JTAG module 108.

In another example, a command at 236 is to configure a "set boot state" parameter of the SOC 104. For example, the codes for booting the SOC 104 can be stored internally within the SOC, can be supplied from a Universal Serial Bus (USB) storage, an external storage, can be supplied via a JTAG interface of the JTAG module 108, and/or the like. The set boot state parameter, for example, specifies the storage media from the SOC 104 is to boot. In an embodiment, the parameter setting module 132 stores one or more configuration parameters associated with the SOC 104, e.g., stores the set boot state parameter. In response to the commands at 236 specifying the set boot state parameter, the enable module 124 configures the set boot state parameter in the parameter setting module 132, to specify the storage media from the SOC 104 is to boot.

In another example, a command at 236 is to configure a "force download" parameter of the SOC 104. For example, as discussed above, the codes for booting the SOC 104 can be stored internally within the SOC, or can be supplied from an external storage. The force download parameter, if enabled, for example, specifies that the SOC 104 is to ignore the boot code stored internally within the SOC 104, and obtain the boot code from an appropriate external storage. On the other hand, the force download parameter, if disabled, specifies that the SOC 104 is use boot code stored internally within the SOC 104. In an embodiment, the parameter setting module 132 stores one or more configuration parameter associated with the SOC 104, e.g., stores the force download parameter. In response to the command at 236 specifying the set boot state parameter, the enable module 124 configures the force download parameter in the parameter setting module 132, to enable or disable this parameter.

In another example, a command at 236 is to configure a mode parameter of the SOC 104. For example, during a "manufacturing mode" of the SOC 104, the fuses 136 are not yet programmed, the JTAG module 108 is not yet enabled, and/or the like (i.e., the SOC 104 is still being manufactured or programmed). Once the SOC 104 is fully manufactured or programmed, the SOC 104, for example, transactions to an "operation mode" of the SOC 104, during which the fuses 136 are programmed, the JTAG module 108 is enabled, and/or the SOC 104 can be used in normal operations. The SOC 104 can also operate in an "analysis mode," where the SOC 104 is tested to identify reasons for failure, the SOC 104 is debugged, and/or the like. In an embodiment, the parameter setting module 132 stores the mode parameter of the SOC 104. In response to the command at 236 specifying the mode parameter, the enable module 124 configures the mode parameter in the parameter setting module 132, to set or change the mode of the SOC 104.

In yet another example, instead of enabling the JTAG module 108, the command at 236 can disable the JTAG module 108 (i.e., assuming that the JTAG module 108 was previously enabled). In response to receiving the command, the enable module 124 writes in the register 128 data to disable the JTGA module 108.

In another example, the command at 236 can permanently disable the JTAG module 108 (i.e., assuming that the JTAG module 108 was previously enabled). For example, a single bit fuse of the fuses 136, if programmed, can result in the JTAG module 108 being permanently disabled. In response to receiving the command, the enable module 124 can program the fuse to permanently disable the JTGA module 108.

Referring again to FIG. 2, subsequent to the enable module 124 receiving the commands and transmitting the acknowledgement, at 244, the host module 120 transmits a command to terminate communication with the enable module 124, which the enable module 124 acknowledges at 248. At 252, the host module 120 transmits a command to clean up the register array 140. For example, the host module 120 transmits a command to write zeros to the register array 140.

Figure 3:
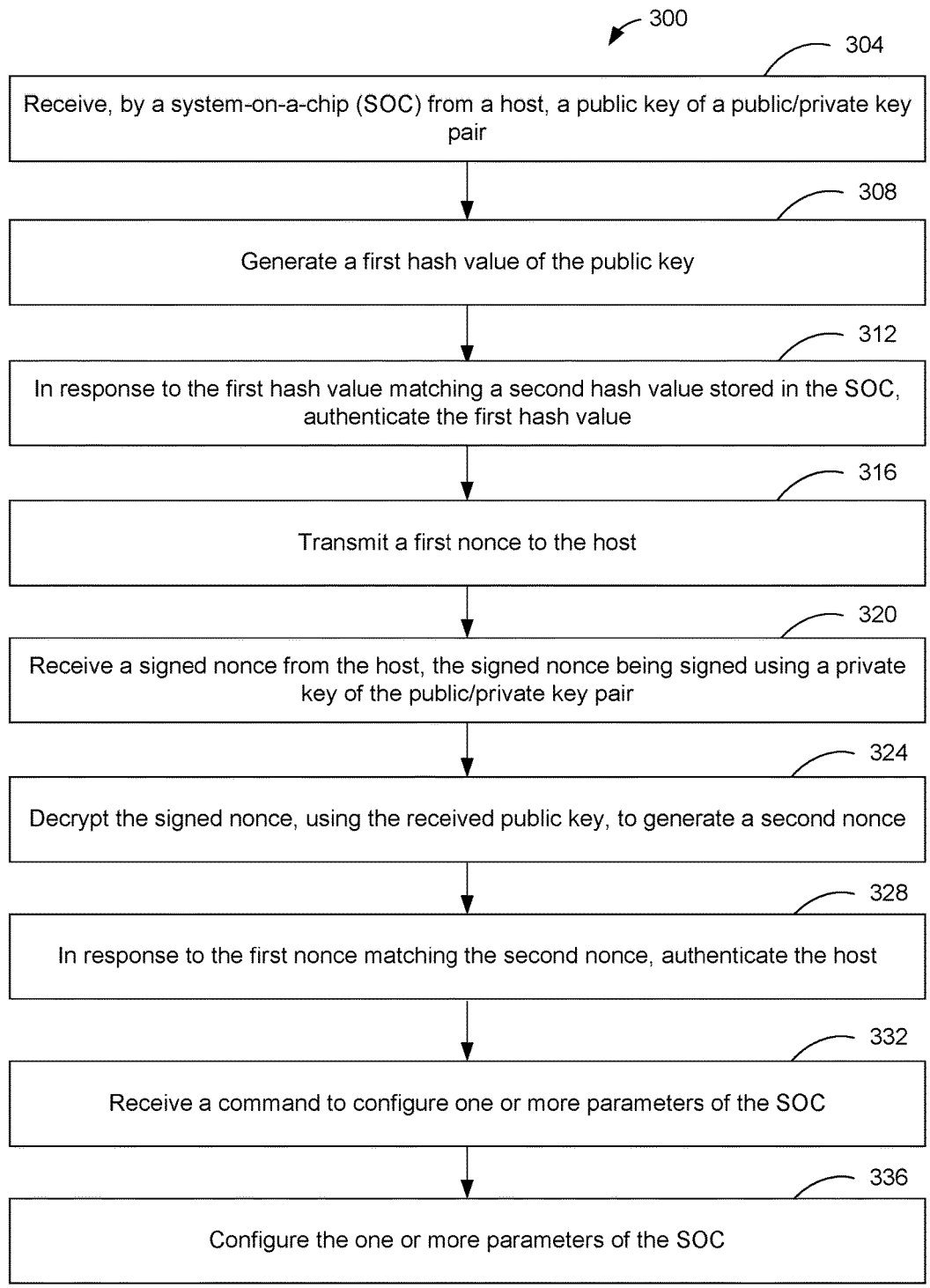
FIG. 3 illustrates a flow diagram of an example method for securely enabling or setting one or more features of a SOC.

FIG. 3 illustrates a flow diagram of an example method 300 for securely enabling or setting one or more features of a SOC (e.g., the SOC 104 of FIG. 1), e.g., enabling JTAG functionalities of the SOC, setting one or more parameters of the SOC, and/or the like. At 304, the SOC (e.g., the enable module 124 of the SOC 104) receives, from a host (e.g., from the host module 120 of the host 116), a public key of a public/private key pair that is stored in the host.

At 308, the SOC generates a first hash value of the public key. Also, a second hash value is stored in the SOC, e.g., burnt in one or more fuses of the SOC. At 312, the SOC compares the generated first hash value with the stored second hash value. In response to the first hash value matching with the stored second hash value, the SOC authenticates the first hash value.

At 316, in response to authenticating the first hash value, the SOC generates and transmits a first nonce to the host. The first none is a random or a pseudo-random number generated by the SOC. The host receives the first nonce, and signs the first nonce using a private key of the public/private key pair to generate a signed nonce. At 320, the SOC receives the signed nonce from the host, the signed nonce being signed by the host using the private key of the public/private key pair.

At 324, the SOC decrypts the signed nonce, using the public key received at 304, to generate a second nonce. The SOC compares the first none and the second nonce. At 328, in response to the first nonce matching the second nonce, the SOC authenticates the host.

In response to the SOC authenticating the host, at 332, the SOC receives, from the host, a command to configure one or more parameters of the SOC. The command can be to enable the JTAG module 108, to set a set boot state parameter of the SOC, a force download parameter of the SOC, a mode parameter of the SOC, to disable a JTAG module of the SOC, to permanently disable the JTAG module of the SOC, and/or the like. At 336, based on the received command, the SOC configures the one or more parameters of the SOC.

The description may use the phrases "in an embodiment," or "in embodiments," which may each refer to one or more of the same or different embodiments. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
receiving, by a system-on-a-chip (SOC) from a host, a public key of a public/private key pair;
generating a first hash value of the public key;
authenticating the first hash value;
in response to authenticating the first hash value, transmitting, by the SOC, a first nonce to the host;
receiving a signed nonce from the host, the signed nonce being signed using a private key of the public/private key pair;
decrypting, using the received public key, the signed nonce to generate a second nonce;
based on the first nonce and the second nonce, authenticating the host;
in response to authenticating the host, receiving, from the host, a command to configure one or more parameters of the SOC; and
configuring the one or more parameters of the SOC.

2. The method of claim 1, wherein authenticating the first hash value comprises:
comparing the first hash value with a second hash value stored in the SOC; and
in response to the first hash value matching the second hash value, authenticating the first hash value.

3. The method of claim 2, further comprising:
storing the second hash value in the SOC, while manufacturing the SOC, by programming the second hash value in one or more fuses within the SOC.

4. The method of claim 1, wherein authenticating the host comprises:
in response to the first nonce matching the second nonce, authenticating the host.

5. The method of claim 1, wherein the received command is to enable a Joint Test Action Group (JTAG) functionality of the SOC, and wherein configuring the one or more parameters of the SOC comprises:
setting a parameter of the SOC to enable the JTAG functionality of the SOC.

6. The method of claim 5, further comprising:
in response to enabling the JTAG functionality of the SOC, testing the SOC in accordance with a JTAG protocol; and
transmitting a result of testing the SOC to a device external to the SOC.

7. The method of claim 1, wherein the received command identifies a storage media from which boot code for the SOC is to be obtained, and wherein configuring the one or more parameters of the SOC comprises:
setting a parameter of the SOC such that the SOC boots from the storage media identified in the received command.

8. The method of claim 1, wherein the received command is to permanently disable a Joint Test Action Group (JTAG) functionality of the SOC, and wherein configuring the one or more parameters of the SOC comprises:
programming a fuse of the SOC such that the JTAG functionality is permanently disabled.

9. The method of claim 1, wherein receiving, from the host, the public key further comprises:
receiving, in a register array of the SOC, the public key from the host; and
reading, from the register array and by an enable module of the SOC, the public key,
wherein the enable module is configured to configure the one or more parameters of the SOC,
wherein the register array is within an unsecured area of the SOC, and
wherein the enable module is within a secured area of the SOC.

10. The method of claim 1, further comprising:
generating, by the SOC, the first nonce such that the first nonce is one of (i) a random or (ii) a pseudo random number.

11. A method comprising:
transmitting, by a host to a system-on-a-chip (SOC), a public key of a public/private key pair, wherein the SOC generates a first hash value of the public key, authenticates the first hash value, and transmits a first nonce to the host;
signing, by the host, the first nonce using a private key of the public/private key pair to generate a signed nonce;
transmitting the signed nonce to the SOC, wherein the SOC decrypts the signed nonce, using the received public key, to generate a second nonce, and wherein the SOC authenticates the host based on the first nonce and the second nonce;
in response to the SOC authenticating the host, transmitting, to the SOC, a command to configure one or more parameters of the SOC.

12. The method of claim 11, wherein the SOC authenticates the first hash value by:
comparing the first hash value with a second hash value stored in the SOC; and
in response to the first hash value matching the second hash value, authenticating the first hash value.

13. The method of claim 12, further comprising:
storing, while manufacturing the SOC, the second hash value in the SOC by programming the second hash value in one or more fuses within the SOC.

14. The method of claim 11, wherein the SOC authenticates the host by:
in response to the first nonce matching the second nonce, authenticating the host.

15. The method of claim 11, wherein the command is to enable a Joint Test Action Group (JTAG) functionality of the SOC.

16. The method of claim 15, further comprising:
in response to the SOC enabling the JTAG functionality of the SOC, testing the SOC in accordance with a JTAG protocol; and
receiving a result of testing the SOC.

17. The method of claim 11, wherein the command identifies a storage media from which boot code for the SOC is to be obtained by the SOC.

18. The method of claim 11, wherein the command is to permanently disable a Joint Test Action Group (JTAG) functionality of the SOC.

19. The method of claim 11, wherein transmitting the public key further comprises:
transmitting, in a register array of the SOC, the public key from the host,
wherein an enable module of the SOC is configured to (i) read the public key from the register array, and (ii) configure the one or more parameters of the SOC,
wherein the register array is within an unsecured area of the SOC, and
wherein the enable module is within a secured area of the SOC.

20. The method of claim 11, further comprising:
securely storing, by the host, the public key and the private key.

\* \* \* \* \*